United States Patent Office 2,813,012
Patented Nov. 12, 1957

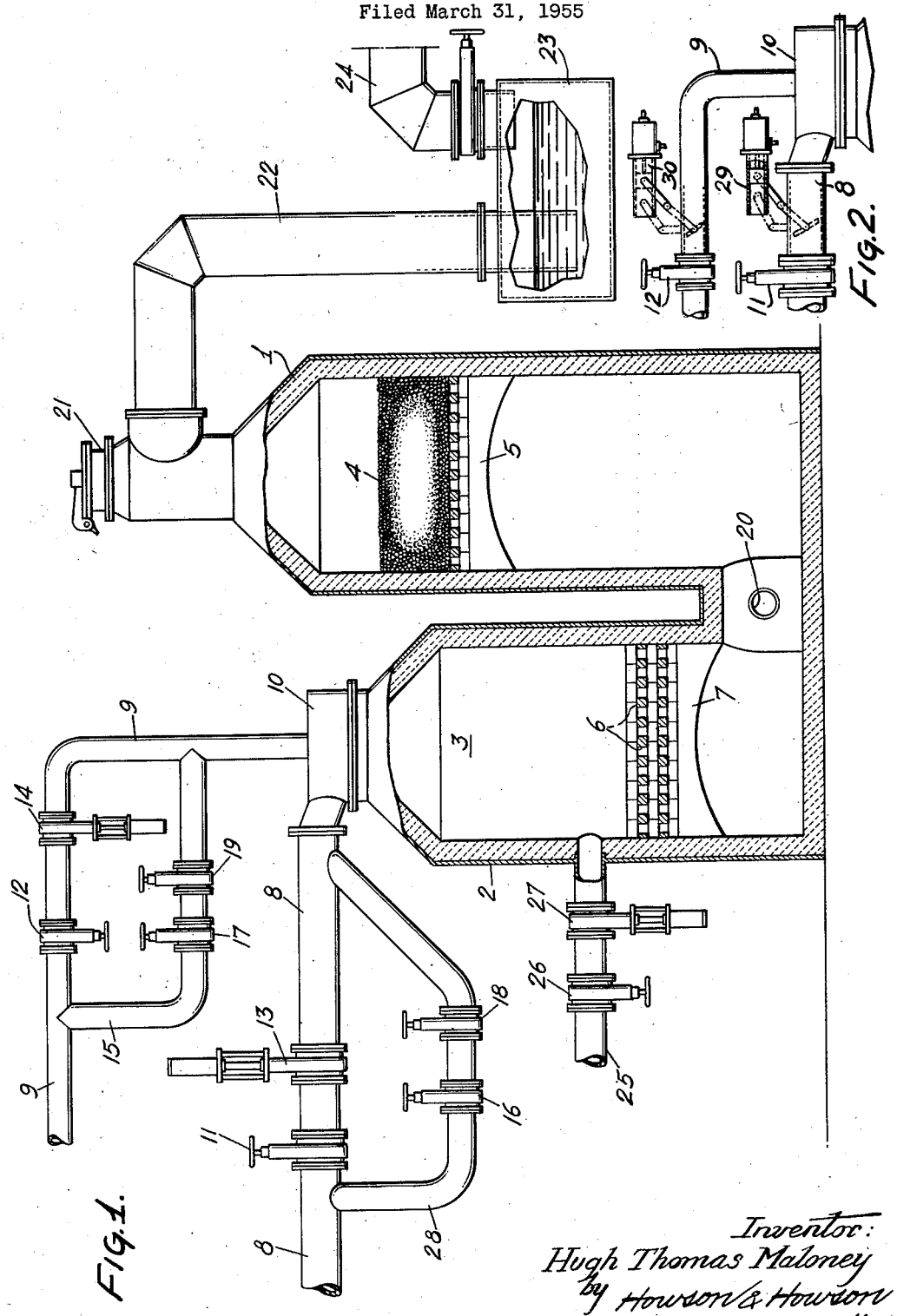

2,813,012
METHOD OF MAKING COMBUSTIBLE GAS

Hugh Thomas Maloney, Feasterville, Pa., assignor to The United Gas Improvement Company, Philadelphia, Pa., a corporation of Pennsylvania Application March 31, 1955, Serial No. 498,370

15 Claims. (Cl. 48—196)

The present invention relates to a novel method for producing a combustible gas; and, more particularly, it relates to an improvement in the cyclic catalytic conversion of a hydrocarbon in the presence of steam and carbon dioxide into a combustible gas utilizing a stationary catalyst zone which is alternately heated internally and then employed to catalyze the reactions involved.

The reaction of a hydrocarbon in the gaseous state with steam and/or carbon dioxide in the presence of a suitable reforming catalyst, such as nickel or cobalt, to form a combustible gas comprising carbon monoxide and hydrogen is well known. Cyclic and continuous procedures for accomplishing this have been developed. Various improvements in the cyclic process form the subject matter of Patent Number 2,665,979, of co-pending applications of John S. Haug, Serial Numbers 181,002 now abandoned, and 181,003 now U. S. Patent 2,720,450, filed August 23, 1950, of Price W. Janeway, Serial Number 180,971, filed August 23, 1950 now U. S. Patent 2,743,171, and of Harold V. Erickson and Francis W. Hartzel, Serial Number 279,934, filed April 1, 1952, now U. S. Patent 2,759,805. More recently there has been developed a process for converting heavier liquid hydrocarbons catalytically into a combustible gas possessing a heating value higher than a mixture of carbon monoxide and hydrogen due to its content of converted or synthesized hydrocarbons. This process is disclosed and claimed in co-pending application of Clarence B. Glover and Charles G. Milbourne, Serial Number 426,776 filed April 30, 1954.

In the general cyclic catalytic converting procedure, in one part of the cycle, termed the heating portion of the cycle, or "blow," a fluid fuel is burned in a combustion chamber and the hot products of combustion are passed ultimately through a stationary catalyst zone to store heat therein. In the other part of the cycle, termed the gas-making portion of the cycle, or "run," the hydrocarbon in the gaseous state, steam and/or carbon dioxide, and preferably also some air, are passed into the heated catalyst zone wherein the reaction takes place.

There are several problems which have been encountered in the commercial operation of this cyclic procedure. One of these problems is the difficulty due to delayed ignition of the fuel at the beginning of the heating portion of each cycle, when the fluid fuel and air are admitted into the relatively cool combusion chamber. Often there is enough delay before the fuel becomes ignited, so that a substantial portion thereof accumulates in the set resulting in a small explosion or surge upon ignition, which may ultimately damage the gas-making equipment or disturb the catalyst. Other problems involve the conservation of heat and the maintainance of optimum temperatures in the equipment and particularly in the combustion chamber and in the catalyst zone where the reaction takes place. Because the procedure is cyclic, the temperatures in the catalyst zone are continuously changing from a high level, immediately following the heating portion of the cycle, to a low level, immediately following the gas-making portion of the cycle. Yet, there is but a relatively narrow temperature range for optimum results for any particular reaction mixture.

Another problem is the control of the specific gravity and the burning characteristics of the combustible gas to meet known gas requirements as determined principally by the hydrogen to inerts ratio thereof. Prior to the present invention, this control, in cyclic procedures, has been accomplished by one or both of two methods. One method involves the use of the known blow-run process with the utilization of products of combustion formed during the heating portion of the cycle, whereby these products of combustion are led to storage and combined with the gas produced during the gas-making portion of the cycle. The other method involves the use of "process air" during the gas-making portion of the cycle providing nitrogen and resulting in the combustion of a portion of the hydrocarbon reactant to products of partial combustion.

It is the principal object of the present invention to provide a novel and improved method for converting, cyclically and catalytically, hydrocarbons, in the presence of steam and carbon dioxide, into a combustible gas.

Another object of the invention is to provide a novel cyclic method for catalytically converting hydrocarbons in the presence of steam and carbon dioxide into a combustible gas by which previous difficulties in cyclic ignition are overcome.

Still another object of the present invention is to provide a method of the type described wherein operating efficiency is improved and gas-making capacity with respect to the size of the unit is increased.

Other objects will become apparent from a consideration of the following specification and the claims.

The process of the present invention is, as stated, cyclic in that it involves a heating step, or blow, comprising the combustion of fuel and the passage of the resulting hot gases through a stationary catalyst zone to store heat therein, and a gas-making step, or run, comprising the passage of the reactants through the heated catalyst zone wherein the reaction takes place until the temperature in the catalyst zone falls to the point where reaction is discontinued. However, in accordance with the present method, during the gas-making portion of the cycle, combustion of the fuel is continued, preferably at a reduced rate from that employed during the heating portion of the cycle, the resulting hot products of combustion are mixed with the hydrocarbon reactant admitted downstream from the combustion zone and the resulting mixture is then fed to the heated catalyst zone.

The process comprises therefore, during the heating portion of the cycle, burning a fluid fuel in a combustion zone and passing the resulting hot products of combustion through a downstream catalyst zone to store heat therein; then, during the gas-making portion of the cycle, continuing burning of the fluid fuel, preferably at a reduced rate from that of said heating portion of the cycle; admitting hydrocarbon reactant and steam and/or carbon dioxide into the resulting hot combustion products passing downstream and comprising water vapor and carbon dioxide; passing the resulting mixture into said catalyst zone wherein conversion of said hydrocarbon in the presence of said carbon dioxide and water vapor into a combustible gas takes place, and leading said combustible gas to storage.

In accordance with the preferred embodiment of the process, a non-catalytic, heat storage refractory zone is also employed between the combustion zone and the catalyst zone, so that the hot combustion products produced during both the heating portion of the cycle and the gas-making portion of the cycle pass through the non-catalytic refractory heat storage zone, and the hydrocarbon reactant employed during the gas-making portion of the cycle is admitted to the path between this non-catalytic heat storage zone and the catalyst zone, and so passes into the catalyst zone without passage through the non-catalytic heat storage zone.

The process of the present invention will be more readily understood from the consideration of the drawings in which:

Figure 1 represents a side elevational view partly in section of apparatus in which the present process may be carried out, and Figure 2 is a side elevational view partly in section of a modification of a portion of the apparatus shown in Figure 1.

In Figure 1, 1 and 2 represent refractory lined chambers which may be the superheater and carburetor, respectively, of a conventional water gas set with appropriate modification as is obvious from the drawing. 3 represents the combustion zone which may be nothing more than a space bounded by the walls and top of chamber 2. 4 represents a catalyst bed which may be supported as by fire arch 5. Advantageously, between combustion 3 and catalyst zone 4, there is provided a non-catalytic, refractory heat storage zone, such as 6. Heat storage zone 6 comprises heat accumulating refractory bodies such as fire brick arranged in familiar checkerwork pattern, as shown, or randomly arranged pieces of refractory material, or a combination of both. The heat-storage material may be supported as by fire brick arch 7.

8 and 9 represent, respectively, the air and fluid fuel supply means for supplying air and fuel to burner element 10. Main conduits 8 and 9 are supplied with hand-controlled, flow-regulating valves 11 and 12, respectively, and with hydraulically operated valves 13, and 14, respectively. Valves 11 and 12 control the rate at which the respective fluids pass therethrough when valves 13 and 14, respectively, are in open position. Because air and fuel are supplied to the burner during the gas-making portion of the cycle in accordance with the present process, the apparatus is also equipped with bypass conduits 28 and 15, respectively, each of which is provided with a hand-operated, flow-regulating valve (16 and 17, respectively), and a stop valve (18 and 19, respectively). Hydrocarbon reactant is admitted to the path, during the gas-making portion of the cycle, between non-catalytic, refractory heat-storage zone 6 and catalyst zone 4, as through port 20, the flow of hydrocarbon being regulated by suitable valves (not shown).

21 represents a stack valve through which combustion products produced during the heating portion of the cycle may be removed from the path and vented to the atmosphere, directly, or by way of a waste heat boiler (not shown). 22 represents a conduit through which the product gas, generated during the gas-making run portion of the cycle, leaves the path and passes through washbox 23 and to storage by way of valved conduit 24. In accordance with known gas practice, the product gases leaving the path for storage during the reaction portion of the cycle may pass through a wasteheat boiler (not shown) before reaching washbox 23.

In the event additional steam and/or carbon dioxide is required during the gas-making portion of the cycle, it may be admitted to the path as through conduit 25 equipped with hand-operated, flow regulating valve 26 and hydraulically operated valve 27. Although the drawing illustrates steam and/or carbon dioxide admission conduit 25 as being located between the combustion zone and the non-catalytic refractory heat-storage zone, it will be understood that at least a portion of the process steam and/or carbon dioxide may be admitted downstream in the path such as between non-catalytic, heat-storage refractory zone 6 and catalyst zone 4.

While the drawing shows heat-storage zone 6 and catalyst zone 4 as single beds, it will be understood that, for structural or other reasons, any of these zones may be made up of two or more separate beds. The process of the present invention is applicable to any of the systems disclosed in the above-mentioned patent and co-pending applications.

An alternate arrangement of apparatus for providing a cyclic change in quantities of air and fluid fuel is shown in Figure 2. Bypass conduits 15 and 28, flow regulating valves 16 and 17, and stop valves 18 and 19 shown in Figure 1 are omitted as are hydraulically operated valves 13 and 14 on conduits 8 and 9. In the modification shown in Figure 2, the functions of these conduits and valves are covered by hydraulically-operated regulating dampers 29 and 30 located respectively in conduits 8 and 9, which by their action will cyclically permit selected greater or lesser rates of flow of air and of fluid fuel, respectively, as required.

The operation of the present process is, as stated, cyclic, and the cycle comprises a heating period during which air and fluid fuel are admitted through valves 13 and 14, respectively, to augment the flow of air and fluid fuel flowing continuously through successive cycles through air and fluid fuel bypass conduits 28 and 15, respectively, combustion taking place in combustion chamber 3. Valves 11 and 12 are set to provide the desired rates of flow of air and hydrocarbon, respectively, which may be added during the heating period to the quantities flowing constantly throughout the gas-making portion of the cycle. If the arrangement of Figure 2 is used, dampers 29 and 30 are shifted cyclically to regulate the flow of air and of fluid fuel, as required. Hot gasses resulting from the combustion are then passed through heat storage zone 6 then over into chamber 1 where they pass through supporting arch 5 and catalyst zone 4, and discharge through stack valve 21. After sufficient heat has been stored in the heat storage zone 6, catalyst zone 4, the refractory linings and supporting arches 5 and 7 for conducting the reaction, the set being at a desired maximum temperature, stack valve 21 and valves 13 and 14 in the arrangement shown in Figure 1, are closed, or in the arrangement shown in Figure 2, dampers 29 and 30 are readjusted.

Valves 18 and 19 in Figure 1, may and preferably do remain open so that air and fluid fuel continue to flow through bypass conduits 28 and 15, respectively. The setting of flow regulating valves 16 and 17 establishes the quantities of air and of fluid fuel which will be admitted during the gas-making portion of the cycle. Generally the rate of fluid fuel admission through the bypass line 15 in Figure 1, or through damper 30 in Figure 2, during the gas-making portion of the cycle, will depend on the rate of air admission through bypass line 28 in Figure 1 or through damper 29 in Figure 2. The total quantity of air admitted during the gas-making part of the cycle depends on the amount of inerts which will be desired in the final gas. Hydrocarbon reactant is also admitted through port 20, and any additional steam and/or carbon dioxide required during the gas-making portion of the cycle may be admitted through conduit 25. During the gas-making portion of the cycle, the hot combustion products produced in combustion zone 3 and comprising mainly water vapor, carbon dioxide and nitrogen, mingle with any additional steam and/or carbon dioxide admitted through 25, and the mixture of highly heated gases passes through non-catalytic, refractory heat-storage zone 6, across into chamber 1 mingling with hydrocarbon reactant admitted through port 20. The resulting hot mixture then passes upwardly through supporting arch 5 and catalyst zone 4 wherein conversion of the hydrocarbon into a combustible gas takes place. The resulting gas is led off to storage by way of conduit 22, washbox 23 and conduit 24. Before the system has cooled to below reaction temperature, the gas-making portion of the cycle is discontinued and the heating portion of the cycle repeated as described above.

Reference has been made hereinabove to the fact that air and fuel may and preferably do flow continuously throughout the cycle, combustion taking place continuously in combustion chamber 3. This preferred operation means that the burner is always operating and there is no cyclic ignition problem. However, certain advantages can still be realized if the operation of the burner is interrupted momentarily, for example, during purging, so long as combustion, preferably at a rate less than during the heating portion of the cycle, takes place during at least the major portion of the gas-making part of the cycle.

While the drawing illustrates two shells, it will be understood that a one- or three-shell set may be employed following the same general principles described above.

The reactions taking place in catalyst zone 4 will be mainly cracking, that is the breaking of larger hydrocarbon molecules into smaller hydrocarbon gas molecules and hydrogen, and reforming, that is the reaction between hydrocarbon and steam and/or carbon dioxide to produce carbon monoxide and hydrogen. Depending upon the nature of the hydrocarbon reactant and the type of product gas desired, reforming or cracking may be the predominant reaction, or both reforming and cracking may be important. In reforming, steam and carbon dioxide are reactants, while in cracking these materials serve principally as diluents or gaseous heat carriers facilitating heating of the hydrocarbon reactant. In either type of reaction, however, the procedure of the present invention provides definite advantages.

It will be seen from the foregoing, that during the gas-making portion of the cycle, hot carbon dioxide and water vapor are produced by virtue of the combustion of the fuel in combustion zone 3. Since it is necessary that these materials, whether they serve as reactants or as diluents, be at an elevated temperature by the time they reach catalyst zone 4, it will be seen that at least a substantial portion of these materials required during the gas-making portion of the cycle are provided at a high temperature in accordance with the present process. The sensible heat in the gases issuing from combustion zone 3 during the gas-making portion of the cycle, can also be relied upon to supply heat to any supplementary steam and/or carbon dioxide added through conduit 25 as well as to the hydrocarbon reactant admitted through port 20. The amount of supplementary steam and/or carbon dioxide, if any, is substantially reduced, and this means less steam which must be supplied from external sources. In addition, the additional heat provided by combustion in combustion zone 3 during the gas-making portion of the cycle, minimizes the cyclic drop in temperature in the catalyst zone inasmuch as less stored heat need be extracted from the catalyst zone both to sustain the reaction, which is endothermic, and to heat reactants, especially hydrocarbon, to reaction temperature. This means that catalyst zone temperatures are maintained more uniform, or are at least maintained at the desired level for a longer period of time and for a greater proportion of cycle time. As a result it has been found that a greater volume of product gas may be produced per day from a given size unit, than in conventional operation of that unit. In addition to all the foregoing, the burner may be maintained in continuous operation during the entire cycle. In this case, cyclic ignition at the beginning of the heating portion of each cycle is thus eliminated, with the result that undesirable cyclic surges in pressure through the apparatus are avoided. Even where operation of the burner is discontinued briefly as mentioned previously, igniting temperatures are maintained in the combustion zone and at the burner thus permitting easier reignition than when operation of the burner is discontinued during the entire gas-making run as in prior procedures.

The blow-run and process air methods have been mentioned as alternative methods of controlling the specific gravity and coincidentally the heating value, as well as the burning characteristics and the hydrogen to inerts ratio of the product gas. When the method of the present invention is employed, as previously mentioned, the necessity of cyclic ignition may be eliminated and also the products of combustion, $CO_2$ and $H_2O$ comprise acceptable reactants for the subsequent reformation. They, together with the accompanying nitrogen, which may comprise a desirable diluent, or even a material for a further chemical use, all enter the non-catalytic heat storage zone at a high temperature and continue to contribute heat to the setting throughout the gas-making portion of the cycle. Where the known blow-run process is used, fluid fuel is burned with air during the heating portion of the cycle and the products are led to storage. This burning is usually conducted with insufficient air for complete combustion. The blow-run process does assist in providing heat for the subsequent reforming reaction, but not during the gas-making portion of the cycle. The products formed are $CO$, $CO_2$, $H_2$ and $H_2O$. The $CO$ and $H_2$ comprise desired components of the finished gas, but the $H_2O$ is not available as a reactant and is lost to the process, whereas under the present invention it is available and helps to conserve the steam supply. Under the present invention the $CO_2$ is also available as a reactant whereas it would be lost as a reactant in the blow-run process.

Under the present invention, process air is admitted with sufficient fuel to support combustion, maintain temperatures in the combustion chamber, and, in the preferred embodiment, eliminate cyclic ignition as stated. If on the other hand, process air without accompanying fuel were to be used (as is known art) it would be necessary to re-ignite fuel on the heating part of each cycle, and re-ignition would be all the more difficult on account of the cooling effect of the process air admitted to the combustion chamber.

It is evident that the process, in contributing heat throughout at least the major portion of the gas-making portion of the cycle to the heat storage zone, will permit the use of a smaller quantity of heat storage material to provide for pre-heating the additional steam or carbon dioxide required. Likewise, in the preferred embodiment, smaller cyclically operated valves will be required since a considerable part of the fluid fuel and air are in constant flow. Furthermore, the use of a cheap fuel for combustion and to supply a portion of the hydrogen and the carbon appearing in the finished gas may permit a decreased use of a more expensive material which it may be necessary to use to convert in the catalyst bed.

It has been stated that the rate at which fuel is burned during the gas-making portion of the cycle may be reduced as required from that employed during the heating portion of the cycle. With the use of a relatively long heating portion of the cycle and a short gas-making portion, it might be desirable to employ substantially the same fuel- and air-flow rates in both portions of the cycle. Usually, however, the rates of flow of fuel and air during the gas-making portion of the cycle will range between about 20 and about 75% of these employed during the heating portion of the cycle.

Air flow rates may be selected which will make the products of combustion formed in the combustion chamber during the gas-making or heating portions of the cycle oxidizing, neutral or reducing. If desired, the relative proportions of air to fuel may be changed at any desired time during the cycle. For instance, as related in copending application Serial Number 279,934, referred to above, it is found desirable to provide a cyclic oxidation-reduction-combustion sequence in the catalyst zone by controlled use of free oxygen admitted to the catalyst bed followed by the admission of reducing gases thereto. This sequence results in a better distribution of heat in the catalyst zone and other advantages providing increased efficiency.

For the oxidation portion of this sequence, in accordance with the present process, excess air may be employed during at least a part of the heating portion of the cycle so that the combustion products contain free oxygen, or a separate air blast may be employed.

During the gas-making portion of the cycle, when excess air is employed at the burner and the combustion products leaving the combustion zone contain free oxygen, further combustion occurs as these combustion products mix with hydrocarbon reactant admitted down stream. Additional heat is thus generated at this point which offsets the cooling effect of the reactants and helps to sustain the catalyst bed temperature during the reaction.

The air supplied during the gas-making portion of the cycle for combustion at the burner may be changed in composition from that supplied during the heating portion of the cycle by enrichment with oxygen, if desired, to avoid nitrogen inclusion beyond desired limits.

In accordance with the present process, all air employed during the gas-making portion of the cycle is preferably admitted at the burner in the combustion chamber. However, if some special local condition, such as adjusting temperatures in the setting, may make it advisable, additional air may be admitted to the setting down stream from the combustion chamber. Such air, if supplied may be enriched with oxygen as described in the preceding paragraph.

The hydrocarbon material utilized as reactant in the gas-making portion of the cycle may comprise normally gaseous hydrocarbon material, such as, for example, methane, ethane, and propane, or vaporizable liquid hydrocarbons such as butane and heavier hydrocarbon distillates, including heavy oils. Corresponding unsaturated hydrocarbons may be present in any desired concentration, such as, for example, ethylene, propylene, butylene, and the like. Natural gas, which is primarily methane, and refinery oil gas which comprises methane, ethylene, and heavier hydrocarbons are among the hydrocarbon materials which may be employed.

With respect to the fuel employed during the heating and gas-making portions of the cycle, it may be any fluid—that is, gaseous or liquid—combustible. Gaseous hydrocarbons, such as those mentioned above, and especially natural gas, are particularly satisfactory, although gaseous fuel not rich in hydrocarbons, such as water gas, producer gas, and the like, may also be used. Liquid hydrocarbons, such as fuel oil, gas oil, gasoline, kerosene, tar, and the like, may be employed, if desired. In the event a liquid fuel is employed, conventional spraying or other vaporizing means may be utilized to facilitate combustion. Obviously, a different fuel may be used during the gas-making portion of the cycle than is used during the heating portion. In this case appropriate conduit means will be provided for each fuel.

Referring to the temperature conditions employed during the cycle, the reactants are pre-heated, preferably to reacting temperatures, before they pass into the catalyst zone. The main consideration, therefore, is that the hydrocarbon reactant, while being heated sufficiently to effect reaction thereof in the catalyst zone, is not heated to a point where significant thermal cracking thereof takes place prior to the catalyst zone with the formation of carbon. The temperature conditions governing this consideration will depend largely upon the particular hydrocarbon reactant employed. It has been found, for example, that, when reforming natural gas, the average temperature of the heat-storage material which it will contact before reaching the catalyst zone should not exceed about 2000° F.

The operation of the process will be more readily understood from a consideration of the following specific example which is given for the purpose of illustration only and is not intended to limit the scope of the invention in any way.

EXAMPLE

In the following cycles natural gas is employed both as the fuel and as the hydrocarbon reactant, and two-minute cycles are employed throughout. The natural gas is reformed by reaction with steam, and in cycle C also with carbon dioxide, to produce carbon monoxide and hydrogen. The apparatus used is similar to that shown in the drawing, and the catalyst is nickel-impregnated, aluminum oxide balls.

One cycle, cycle A, employs a "blow-run" in which fuel is burned in the combustion chamber as a separate step, and the resulting products of combustion are led to storage for admixture with the product gas formed during the gas-making portion of the cycle. In another cycle, cycle B, "process air" is admitted along with the hydrocarbon during the gas-making portion of the cycle. In cycle C, the cycle of the present invention, fuel is continuously burned even during the gas-making portion of the cycle, although at a reduced rate from that employed during the heating portion of the cycle, and these hot products of combustion are mingled with the hydrocarbon reactant and the resulting mixture passed into the catalyst zone where reformation takes place.

The following tables set forth all the operating data for the three cycles:

Table I

| Cycle | A | B | C |
|---|---|---|---|
| Kind of Operation | Normal Blow-Run | Process Air | Present Method |
| Number of days of operation | 2 | 4 | 4 |
| Running hours per day | 24 | 15.70 | 11.85 |
| Make per running hr. (MCF.) | 626 | 677 | 920 |
| Make per set day (MCF.) | 15,024 | 16,266 | 22,074 |
| B.t.u | 322 | 288 | 260 |
| Sp. Gr | .577 | .559 | .596 |
| H₂/inerts ratio | 1.32 | 1.38 | 1.05 |
| Cracking efficiency | 38.7 | 50.2 | 50.0 |
| Natural Gas—Total/MCF. (C. F.) | 351 | 329 | 285 |
| For process/MCF. (C. F.) | 286 | 268 | 243 |
| For heating/MCF. (C. F.) | 64 | 60 | 42 |
| Process and Heating eff. (percent) | 87.0 | 83.2 | 87.4 |
| Steam produced (lb./MCF.)¹ | 23.4 | 23.1 | 22.8 |
| Steam used, lb./MCF | 17.8 | 14.2 | 11.1 |
| H₂ produced per day (MCF.) | 6,415 | 7,248 | 9,105 |
| Gas Analyses: | | | |
| Ill, percent | 0.3 | 0.0 | 0.0 |
| CO, percent | 8.9 | 11.7 | 9.8 |
| H₂, percent | 42.7 | 44.5 | 41.2 |
| CH₄, percent | 15.4 | 10.9 | 9.1 |
| C₂H₆, percent | 0.7 | 1.2 | .51 |
| CO₂, percent | 8.1 | 6.9 | 7.3 |
| O₂, percent | 0.2 | 0.2 | 0.2 |
| N₂, percent | 24.1 | 25.3 | 31.9 |
| B. t. u. (calc.) | 333 | 298 | 264 |
| Sp. Gr | .572 | .562 | .602 |
| Cycle, minutes | 2 | 2 | 2 |
| Open Stack Blow, percent | 23 | 27 | 22 |
| Air Rate, C. F./min | 19,500 | 18,991 | 20,000 |
| Gas Rate, C. F./min | 1,375 | 1,361 | 975 |
| Air Purge, percent | 5 | 5 | |
| Air rate, C. F./min | 19,500 | 18,992 | |
| Steam Purge,³ percent | 3 | 3 | 3 |
| Gas rate | | | 500 |
| Steam rate, lb./min | 350 | 300 | 200 |
| Air rate | | | 8,000 |
| Cracking Run, percent | 44 | 43 | 73 |
| Gas Rate, C. F./min | 6,000 | 6,000 | ² 500/4,572 |
| Steam rate, lb./min | 350 | 300 | 200 |
| Air rate, C. F./min | | 2,059 | 8,000 |
| Steam Purge,⁴ percent | 1 | 1 | 1 |
| Gas rate | | | 500 |
| Steam rate, lb./min | 350 | 300 | 200 |
| Air rate | | | 8,000 |
| Air Purge, percent | 1 | 1 | |
| Air rate, C. F./min | 16,000 | 15,976 | |
| Blow, percent | 23 | 20 | 1 |
| Air rate, C. F./min | 16,000 | 15,976 | 17,000 |
| Gas rate, C. F./min | 1,375 | 1,361 | 975 |
| Temperatures: | | | |
| Cat. Base, °F | 1,281 | 1,443 | 1,478 |
| Cat. Top, °F | 1,142 | 1,190 | 1,130 |
| Open Blow: | | | |
| CO₂, percent | 9.4 | 9.4 | 6.1 |
| O₂, percent | 4.2 | 4.3 | 10.2 |
| Closed Below: | | | |
| CO₂, percent | 11.3 | 11.2 | |
| O₂, percent | .85 | 1.2 | |

¹ From waste heat boiler.
² 500 C. F./min. at burner; 4572 C. F./min. process.
³ Steam turned on before hydrocarbon admitted to insure presence of steam in cycle C.
⁴ Steam turned off after hydrocarbon discontinued in cycle C.

Table II

|  | Percent of Cycle | Air Rate, C. F./min. | Steam Rate, lb./min. | Nat. Gas Rate, C. F./min. |
|---|---|---|---|---|
| Cycle A—Normal Blow Run (2-Minute Cycle): | | | | |
| Open Stack Blow | 23 | 19,500 | | 1,375 |
| Air Purge | 5 | 19,500 | | |
| Steam Purge | 3 | | 350 | |
| Cracking Run | 44 | | 350 | 6,000 |
| Steam Purge | 1 | | 350 | |
| Air Purge | 1 | 16,000 | | |
| Blow | 23 | 16,000 | | 1,375 |
| H₂ produced per set day, MCF | | 6,415 | | |
| Average Cat. bed temp., °F | | 1,212 | | |
| CO₂, Open Blow | | 9.4 | | |
| O₂, Open Blow | | 4.2 | | |
| CO₂, Closed Blow | | 11.3 | | |
| O₂, Closed Blow | | 0.8 | | |
| Cycle B—Process Air (2-Minute Cycle): | | | | |
| Open Stack Blow | 27 | 18,991 | | 1,361 |
| Air Purge | 5 | 18,992 | | |
| Steam Purge | 3 | | 300 | |
| Cracking Run | 43 | 2,059 | 300 | 6,000 |
| Steam Purge | 1 | | 300 | |
| Air Purge | 1 | 15,974 | | |
| Blow | 20 | 15,976 | | 1,361 |
| H₂ produced per set day, MCF | | 7,248 | | |
| Average Cat. bed temp., °F | | 1,317 | | |
| CO₂, Open Blow | | 9.4 | | |
| O₂, Open Blow | | 4.3 | | |
| CO₂, Closed Blow | | 11.2 | | |
| O₂, Closed Blow | | 1.2 | | |
| Cycle C (2-Minute Cycle): | | | | |
| Open Stack Blow | 22 | 20,000 | | 975 |
| Steam Purge | 3 | 8,000 | 200 | 500 |
| Cracking Run | 73 | 8,000 | 200 | 500/4,572 |
| Steam Purge | 1 | 8,000 | 200 | 500 |
| Blow | 1 | 17,000 | | 975 |
| H₂ produced per set day, MCF | | 9,105 | | |
| Average Cat. bed temp., °F | | 1,304 | | |
| CO₂, Open Blow | | 6.1 | | |
| O₂, Open Blow | | 10.2 | | |

I claim:

1. The cyclic catalytic method for converting a hydrocarbon into combustible gas having a controlled heating value and burning characteristics which comprises, during the heating portion of the cycle, burning fluid fuel in a refractory-lined combustion zone and passing the hot products of combustion through a refractory-lined path and through a catalyst zone comprising a catalyst selected from the group consisting of nickel and cobalt contained in said path to store heat therein; then, in the gas-making portion of the cycle, continuing the burning of fluid fuel in said combustion zone without any substantial interruption and passing the resulting hot products of combustion along said path, simultaneously admitting to said path downstream from said combustion zone and mixing with said hot combustion products a hydrocarbon, passing the mixture into said catalyst zone wherein conversion of said mixture into a combustible gas takes place, and leading the resulting gas to storage.

2. The method of claim 1 wherein said catalyst comprises nickel, and the fuel burned in the gas-making portion of the cycle is at a reduced rate from the heating portion of the cycle.

3. The method of claim 1 wherein air supplied for burning said fluid fuel during the gas-making portion of the cycle is enriched with oxygen.

4. The cyclic catalytic method for converting a hydrocarbon into a combustible gas having controlled heating value and burning characteristics which comprises, during the heating portion of the cycle, burning fluid fuel in a refractory-lined combustion zone and passing the hot products of combustion through a non-catalytic refractory, heat-storage zone and then through a catalyst zone comprising a catalyst selected from the group consisting of nickel and cobalt contained in a refractory-lined path storing heat therein; then, in the gas-making portion of the cycle, continuing the burning of fluid fuel in said combustion zone without any substantial interruption and passing the resulting hot products of combustion along said path, simultaneously admitting to said path between said non-catalytic, refractory, heat-storage zone and said catalyst zone, and mixing with said hot combustion products, a hydrocarbon, passing the resulting mixture into said catalyst zone wherein conversion of said mixture into a combustible gas takes place, and leading the resulting gas to storage.

5. The method of claim 4 wherein supplementary oxygen-containing gas selected from the group consisting of steam and carbon dioxide is added to said hot combustion products produced during the gas-making portion of the cycle.

6. The method of claim 4 wherein the fuel burned in the gas-making portion of the cycle is at a reduced rate from the heating portion of the cycle.

7. The method of claim 5 wherein said catalyst comprises nickel, and said supplementary oxygen-containing gas is admitted to said path before said non-catalytic, refractory, heat-storage zone.

8. The method of claim 5 wherein the rate at which fuel is burned during the gas-making portion of the cycle is at a reduced rate from the heating portion of the cycle.

9. The method of claim 8 wherein the rate at which said fuel is burned during the gas-making portion of the cycle is between about 20% and about 75% of that during the heating portion of the cycle.

10. The cyclic catalytic method for converting a hydrocarbon into combustible gas having a controlled heating value and burning characteristics which comprises, during the heating portion of the cycle, burning fluid fuel in a refractory-lined combustion zone and passing the hot products of combustion through a refractory-lined path and through a catalyst zone comprising a catalyst selected from the group consisting of nickel and cobalt contained in said path to store heat therein; then, in the gas-making portion of the cycle, continuing the burning of fluid fuel in said combustion zone without interruption and passing the resulting hot products of combustion along said path, simultaneously admitting to said path downstream from said combustion zone and mixing with said hot combustion products a hydrocarbon, passing the resulting mixture into said catalyst zone wherein conversion of said mixture into a combustible gas takes place, and leading the resulting gas to storage.

11. The method of claim 10 wherein supplementary oxygen-containing gas selected from the group consisting of steam and carbon dioxide is added to said hot combustion products produced during the gas-making portion of the cycle.

12. The cyclic catalytic method for converting a hydrocarbon into a combustible gas having controlled heating value and burning characteristics which comprises, during the heating portion of the cycle, burning fluid fuel in a refractory-lined combustion zone and passing the hot products of combustion through a non-catalytic refractory, heat-storage zone and then through a catalyst zone comprising a catalyst selected from the group consisting of nickel and cobalt contained in a refractory-lined path storing heat therein; then, in the gas-making portion of the cycle, continuing the burning of fluid fuel without interruption but at a reduced rate from said first-mentioned burning of fuel in said combustion zone and passing the resulting hot products of combustion along said path, simultaneously admitting to said path between said non-catalytic, refractory, heat-storage zone and said catalyst zone, and mixing with said hot combustion products, a hydrocarbon, passing the resulting mixture into said catalyst zone wherein conversion of said mixture into a combustible gas takes place, and leading the resulting gas to storage.

13. The cyclic catalytic method for converting a hydrocarbon into a combustible gas having controlled heating value and burning characteristics which comprises, during the heating portion of the cycle, burning a fluid fuel and passing the hot products of combustion through a non-catalytic, refractory, heat-storage zone and then through a catalyst zone comprising nickel and contained in a refractory-lined path, to store heat therein; then, during the gas-making portion of the cycle, continuing the burning of fluid fuel without interruption but at a reduced rate from said first-mentioned burning of fuel, and passing the resulting hot products of combustion along said path, simultaneously admitting to said path supplementary oxygen-containing gas selected from the group consisting of steam and carbon dioxide and a hydrocarbon, at least the latter of which is admitted to said path between said non-catalytic, refractory, heat-storage zone and said catalyst zone, to provide a mixture of said hot products of combustion, supplementary oxygen-containing gas and hydrocarbon, passing the resulting mixture into said catalyst zone wherein conversion of said mixture into a combustible gas takes place, and leading the resulting gas to storage.

14. The method of claim 13 wherein said supplementary oxygen-containing gas is admitted to said path before said non-catalytic, refractory, heat-storage zone.

15. The method of claim 14 wherein the rate at which said fuel is burned during the gas-making portion of the cycle is between about 20% and about 75% of that during the heating portion of the cycle.

References Cited in the file of this patent

UNITED STATES PATENTS

| | | |
|---|---|---|
| 1,954,991 | Garner | Apr. 17, 1934 |
| 1,958,201 | Nagel | May 8, 1934 |
| 2,140,316 | Furlong | Dec. 13, 1938 |
| 2,230,467 | Nelly et al. | Feb. 4, 1941 |
| 2,336,311 | Steinwedell | Dec. 7, 1943 |
| 2,720,450 | Haug | Oct. 11, 1955 |